United States Patent
Gupta et al.

(10) Patent No.: US 10,861,238 B2
(45) Date of Patent: Dec. 8, 2020

(54) EXPERIENTIAL REPRESENTATION OF DATA IN MIXED REALITY

(71) Applicant: Microsoft Technology Licensing, LLC, Redmond, WA (US)

(72) Inventors: Shalu Gupta, Hyderabad (IN); Bibhu Choudhary, Hyderabad (IN); Alok Agrawal, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 15/978,398

(22) Filed: May 14, 2018

(65) Prior Publication Data

US 2019/0347857 A1 Nov. 14, 2019

(51) Int. Cl.
*G06T 19/00* (2011.01)
*G03H 1/00* (2006.01)
*G06K 9/62* (2006.01)

(52) U.S. Cl.
CPC ......... *G06T 19/006* (2013.01); *G03H 1/0005* (2013.01); *G03H 2001/0088* (2013.01); *G06K 9/6254* (2013.01)

(58) Field of Classification Search
None
See application file for complete search history.

(56) References Cited

U.S. PATENT DOCUMENTS

| 2008/0239078 A1 | 10/2008 | Mohr et al. |
| 2015/0187138 A1 | 7/2015 | Mullins |
| 2016/0055674 A1 | 2/2016 | Mullins et al. |
| 2016/0163063 A1 | 6/2016 | Ashman |
| 2017/0092008 A1 | 3/2017 | Djorgovski et al. |
| 2018/0047395 A1 | 2/2018 | Sommers et al. |
| 2018/0075658 A1* | 3/2018 | Lanier ................ G06T 19/006 |

FOREIGN PATENT DOCUMENTS

WO   2010029553 A1   3/2010

OTHER PUBLICATIONS

Mboya, Ari Michelle, "Data Visualization in Virtual Reality—A VR Demo Project", Retrieved from <<https://medium.com/inborn-experience/data-visualization-in-virtual-reality-a-vr-demo-project-a31c577aaefc>>, Dec. 16, 2017, 19 pages.

Olshannikova, et al., "Visualizing Big Data with Augmented and Virtual Reality: Challenges and Research Agenda", In Journal of Big Data, vol. 2, Issue 1, Dec. 2015, 53 Pages.

"International Search Report and Written Opinion Issued in PCT Application No. PCT/US19/029551", dated Jun. 28, 2019, 12 Pages.

* cited by examiner

*Primary Examiner* — Michelle Chin
(74) *Attorney, Agent, or Firm* — David Chin; Chin IP, PLLC

(57) ABSTRACT

The disclosed technology is generally directed to mixed reality visualization. In one example of the technology, a mixed-reality view is provided. The mixed-reality view includes at least a real-world component and at least a virtual component. The virtual component includes a view associated with an application. Data in the application that is associated with a quantified property is identified. For the identified data, a data type and a quantity are determined. An experiential visualization library is used to create an experiential visualization of the data based on the determined data type and the determined quantity. The created experiential visualization is displayed as part of the virtual component of the mixed reality view.

20 Claims, 7 Drawing Sheets

SPEED – 10 MILES/HR

EXPERIENTIAL REPRESENTATION OF DATA IN MIXED REALITY

BACKGROUND

Typically, mixed reality (MR) refers to a combination of virtual and real environments to produce new environments and visualizations where physical and digital objects co-exist and can be interacted with in real time. Typically, mixed reality takes place not only in the physical world or the virtual world, but includes a mix of elements from reality and virtual reality, encompassing both augmented reality and augmented virtuality via immersive technology.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to mixed reality visualization. In one example of the technology, a mixed-reality view is provided. In some examples, the mixed-reality view includes at least a real-world component and at least a virtual component. In some examples, the virtual component includes a view associated with an application. In some examples, data in the application that is associated with a quantified property is identified. In some examples, for the identified data, a data type and a quantity are determined. In some examples, an experiential visualization library is used to create an experiential visualization of the data based on the determined data type and the determined quantity. In some examples, the created experiential visualization is displayed as part of the virtual component of the mixed reality view.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
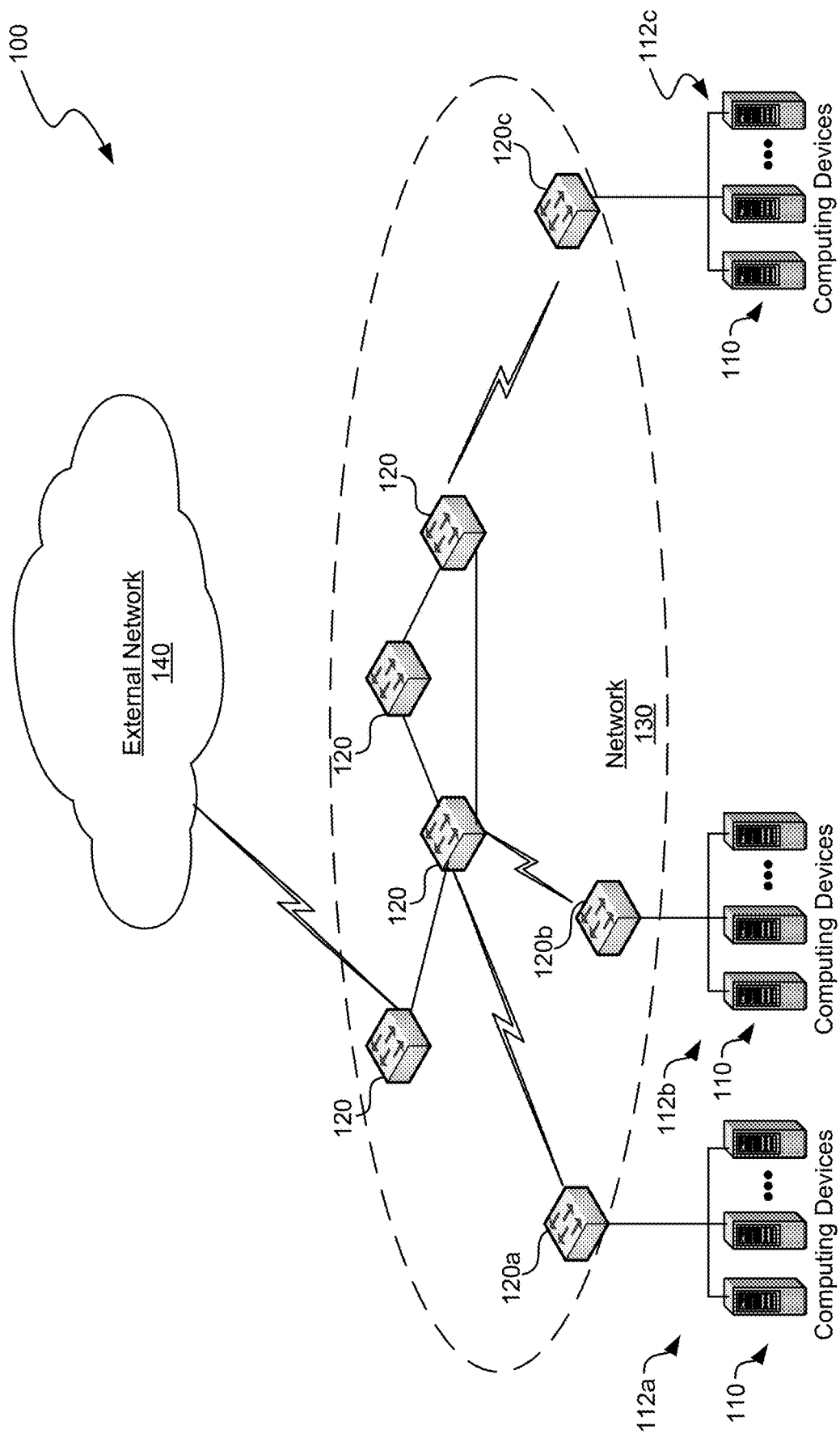
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to mixed reality visualization. In one example of the technology, a mixed-reality view is provided. In some examples, the mixed-reality view includes at least a real-world component and at least a virtual component. In some examples, the virtual component includes a view associated with an application. In some examples, data in the application that is associated with a quantified property is identified. In some examples, for the identified data, a data type and a quantity are determined. In some examples, an experiential visualization library is used to create an experiential visualization of the data based on the determined data type and the determined quantity. In some examples, the created experiential visualization is displayed as part of the virtual component of the mixed reality view.

In some examples, a user with a mixed-reality device may encounter data in an application while viewing the application. The user may be given an option to view an experiential representation of the data. In some examples, if the user takes this option, an appropriate experiential representation is selected and provided to user as part of the mixed-reality view for better comprehension of the data. The experiential representation of data may make it easier for user to consume and comprehend the data visualized in front of them.

For instance, if data in a news article in a browser reported that yesterday the wind was blowing at the speed of 75 km/hour, if the user opts to receive an experiential visualization of the data, the mixed-reality device may then provide, as part of the mixed-reality view experienced by the user, a three-dimensional hologram of a tree whose branches and/or leave are being bent by the wind, with the amount of bending realistically represented based on the speed of the wind.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices no may be individually configured to provide computing, storage, and/or other suitable computing services.

Although FIG. 1 shows an example of a device in a network environment, not all examples of the disclosure are network devices. That is, some examples of the disclosure are capable of operating as connected devices that communicate with one or more networks, and some example of the disclosure are not capable of connecting to a network.

Illustrative Computing Device

Figure 2:
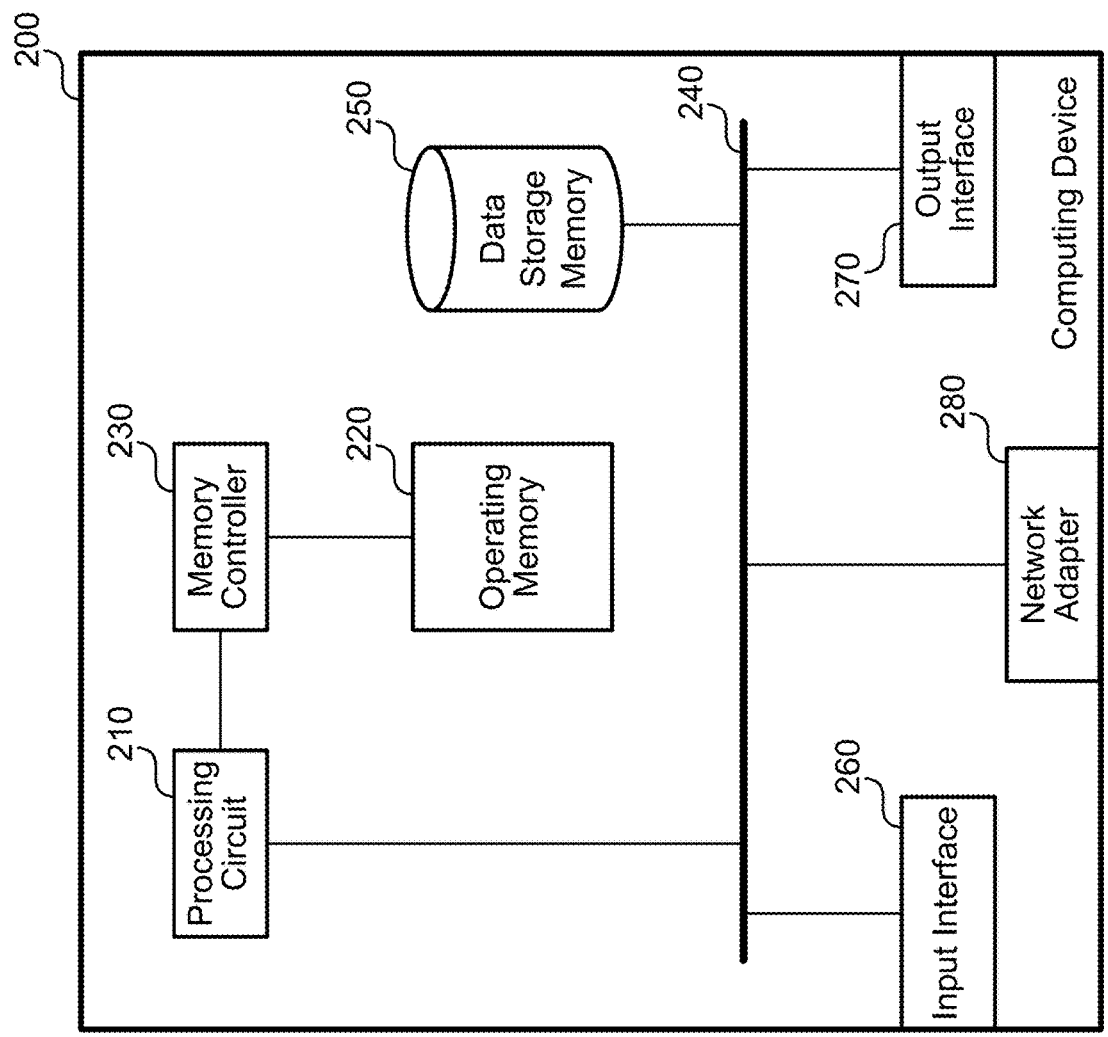
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as a single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
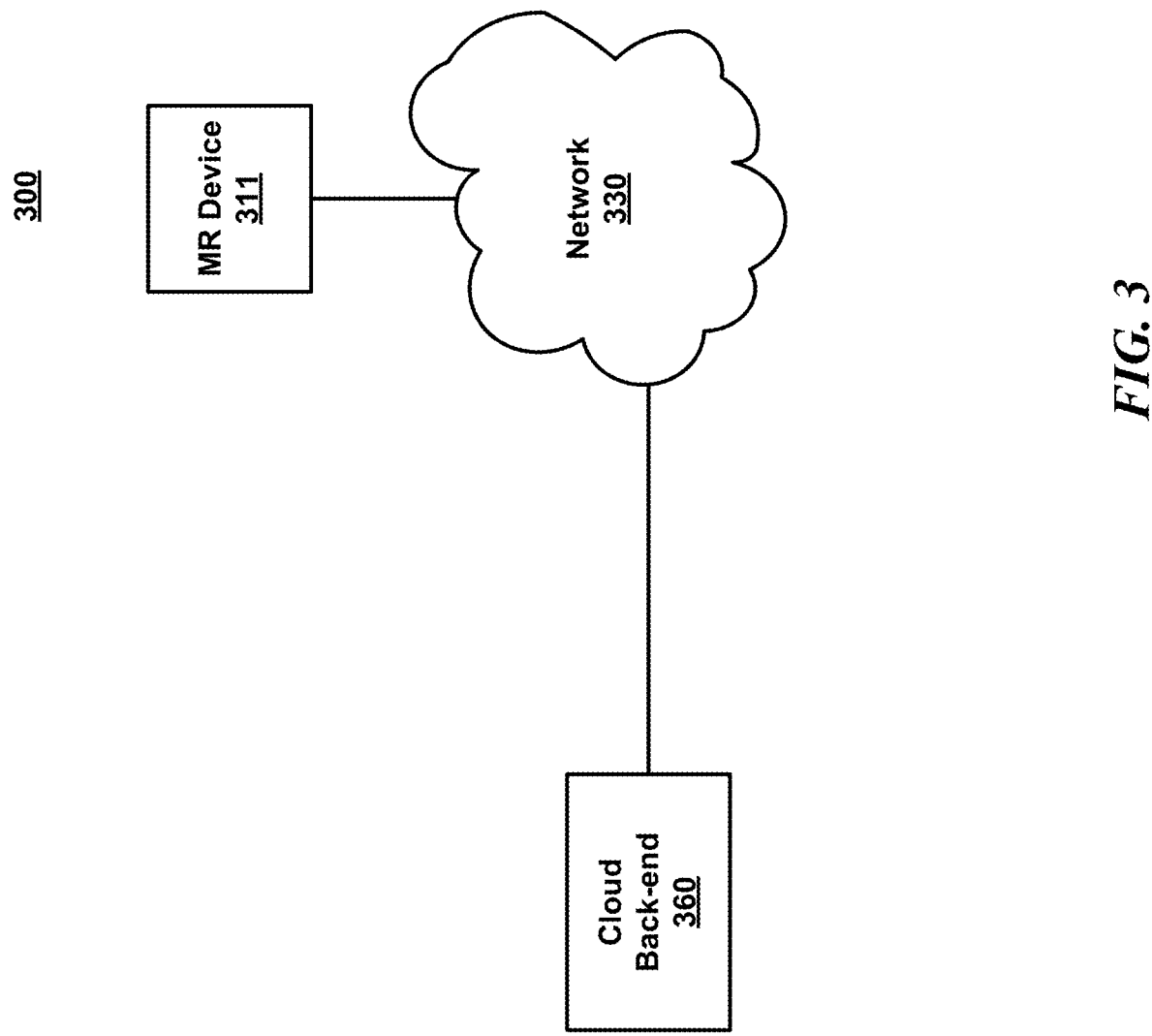
FIG. 3 is a block diagram illustrating an example of a system.

FIG. 3 is a block diagram illustrating an example of a system (300). System 300 may include network 330, as well MR device 311 and cloud back-end 360, which may each connect to network 330.

MR device 311 may include an example of computing device 200 of FIG. 2. Application back-end 360 refers to a device, or multiple devices such as a distributed system, that may assist in providing functionality to MR device 311 via communication over network 330. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication technology by which information may travel between MR device 311 and cloud back-end 360. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

MR device 311 may include any suitable MR device such as a pair of mixed-reality smartglasses. Some examples of MR device 311 may be a head-mounted display unit connected to an adjustable inner headband. Some examples of MR device 311 may include a self-contained holographic computer that enables a user to engage with digital content and interact with holograms while simultaneously viewing the real world. Some examples of MR device 311 may include cameras, processors, lenses, 3D audio speakers, a battery, and various specialized components such as multiple sensors, advanced optics, and a custom holographic processing unit. Some examples of MR device 311 may include physical buttons on the side which may be pressed to actuate various functions.

Some examples of MR device 311 may communicate with cloud back-end 360 to provide certain functions associated with MR device 311. Other examples of MR device 311 provide full functionality within MR device 311 without requiring communication with cloud back-end 360, and cloud back-end 360 is not included in some examples. In some examples, MR device 311 is network-connected, and in other examples, MR device 311 is not network connected.

MR device 311 may allow a user to simultaneously view the real world and virtual objects that can interact with each other in real time. The user may also be able to manipulate the virtual objects in various ways. The user may also be able to view applications in the mixed-reality view provided by MR device 311.

There may be times when just seeing the data as static visualization doesn't help in comprehending the data to the fullest extent. In some examples, it is only when the user experiences the data in a real-life scenario that the user fully understands the data. For instance, if an article states that wind is blowing at the speed of 100 km/hour during a cyclone, it may be difficult for the user to gauge the intensity of wind unless and until the user can experience the wind speed in a dynamic manner. Some examples of MR device 311 idea provide an experiential representation of data to make it easier for the user to consume and comprehend the data visualized in front of the user.

A user may encounter data while viewing an application in the mixed-reality view. The user may be given an option to view an experiential representation of the data. If the user takes this option, an appropriate experiential representation is selected and provided to user as part of the mixed-reality view for better comprehension of the data.

For example, a user may view a news article in a browser that reports that yesterday the wind was blowing at 75 km/hour. The user may be given an option to view an experiential representation of this data. In some examples, if the user opts to receive an experiential visualization of the data, the mixed-reality device may then provide, as part of the mixed-reality view experienced by the user, a three-dimensional hologram of a tree whose branches and/or leaves are being bent by the wind, with the amount of bending realistically represented based on the speed of the wind. The experiential visualization is not a static visualization.

The type of experiential visualization provided by MR device 311 may vary based on the data type, as well as the quantity of data. For instance, in the example of wind blowing, more bending in the branches/leaves may be shown with greater intensity of the wind.

Another example of a data type may be water flowing. For instance, in some examples, if the user encounters data of water flowing at a speed of 10 m/s from a pipe, the experiential visualization may show water coming out of a nozzle at 10 m/s and the distance that the water travels before hitting the ground. As another example, if the user encounters data that the maximum speed at which Usain Bolt can run is 44 km/hours, the experiential visualization may show 3D holograms of two humans, one running at a speed of 44 km/hour, and another walking at normal speed.

Examples of representing velocity have been discussed above. In various examples, other suitable quantifiable properties defined in physics may be visualized, such as acceleration, temperature, mass, and/or the like.

MR device 311 may use an experiential visualization library/experiential representation repository to provide the experiential visualization/experiential representation in some examples. The visualization may include a variety of different kinds of visualizations, including visualizations for different data types. The visualization may be vary based on the quantity. For instance, in some examples, the created experiential representation includes at least one moving three-dimensional hologram that is associated with the determined data type and the determined quantity, where at least one aspect of the created experiential representation varies in a realistic manner in accordance with the determined quantity. For instance, in the example discussed above, in the case of wind blowing, the bending viewable in the trees and branches varies based on the quantity, which is the wind speed in this example. The visualization library may be stored in MR device 311 in some examples, or may be accessed from cloud back-end 360 in other examples.

Machine learning may be used in helping to identify what the data type is, what quantity is applicable, and which experiential visualization should be used to represent the data. For instance, multiple words or phrases may be used to refer to the same thing, or there may be a misspelling. For example, the words speed and velocity may both be used to refer to the same thing. Or the word velocity may be misspelled. In each case, machine learning may be used to assist MR device 311 in determining what data type the user wishes converted into an experiential visualization. In some examples, the machine learning will select whichever data type has the highest confidence score as determined by the machine learning.

A user may also have a preference for a particular type of experiential visualization in a particular context. For instance, MR device 311 may determine that two different experiential visualizations might be applicable to particular data to be represented. In some examples, the user may be asked which of the two experiential visualizations the user prefers. MR device 311 may then make the selected experiential visualization the default in similar situations. In other examples, the user may provide feedback after the experiential visualization is provided rather than before. In either case, machine learning may be used to better provide experiential visualizations in accordance with a user's preference over time.

The machine learning may include both initial training with training data, as well as training during actual use of MR device 311.

Different suitable types of experiential visualizations may be provided in various different examples. For instance, examples of experiential visualizations that include dynamic 3D holograms have been discussed with regard to some examples. However, in various examples, other suitable experiential visualizations may also be used. The type of experiential visualization provided may vary based on the device used in some examples. For instance, in some examples, a user may be using a high-end MR device, and dynamic 3D holograms may accordingly be used for the experiential visualizations in some examples. In other examples, the type of experiential visualizations may be more limited based on the limits of the particular device being used.

One example of use of MR device 311 may proceed as follows. A user may be wearing MR device 311 and be provided with a mixed-reality view that includes a real-world view in conjunction with virtual components that can interact with the real-world view and the user in real time. The user may virtually view an application within the MR view. Code may be running which determines whether data that is associated with a suitable quantifiable property is present in the view of the application seen by the user. In some examples, this code is running by default. In some examples, this code is not running by default but may be activated by the user. In some examples, the user may first perform such action, such as selecting particular data in an application, before the code determines whether or not such data is present in the application.

The code, when running may identify the data, and provide to the user an indication that it is possible to have an experiential visualization of the data provided as part of the mixed-reality view. The manner of the indication may vary in different examples. For instance, in one example, the data is provided in an HTML table, and the running code may determine, based on the HTML, that a table is present, and may analyze the table to determine that suitable data may be present in the table. Determining whether the data is suitable may include determining whether the data is a quantified property for which a corresponding data type exists in the experiential visualization library. Upon making this determination, the code may cause the mixed-reality view to be altered so that a virtual button is shown on the side of the browser window next to the table. In some examples, this indication, such as the button, would not appear unless the user first selected the table, and then MR device 311 would analyze the table, determine that suitable data is present, and then provide the virtual button at the side of the table. If the user presses the virtual button, MR device 311 may then provide an experiential representation of the data.

MR device 311 provides the experiential representation of the data as follows in some examples. MR device 311 may determine the data type and quantity of the data selected by the user. In some examples, machine learning may be used to assist in the determination. MR device 311 may then determine an experiential representation for the data based on the determined data type and quantity using the experiential visualization library. The experiential visualization library may provide mappings between various data types and corresponding experiential visualizations. In some examples, machine learning may also be used in determining which experiential visualization table to be used or how to display the experiential visualization.

In some examples, the experiential visualization is then displayed as one of more virtual components of the mixed-reality view. Once the experiential visualization has been displayed, the user may be able to interact with, adjust, and/or manipulate the experiential visualization in various ways. For instance, in some examples, the user can use his hands to physically move the location of the experiential visualization. In some examples, the user may be able to filter the data provided in the experiential visualization. For instance, in some examples, the experiential visualization may provide multiple different sets of data, and the user may de-select one of the sets of data such that the de-selected set of data is no longer shown as part of the experiential visualization. For example, the user may de-select the data by unchecking a checkbox in some examples, by physically grabbing the data to be selected and throwing it away, and/or in other suitable manners in various examples.

In some examples, the experiential visualization library is a pre-created library in which the various data types of the library are segregated based on the category of objects being visualized and fields they belong to, for examples, turbine machine, boiler, transformer, and/or the like. In some examples, there may be specialized libraries for specialized use cases. For example, there may be a specialized library for mechanical engineering that may be used in a mechanical engineering use case.

System 300 may include more or less devices than illustrated in FIG. 3, which is shown by way of example only.

Figure 4:
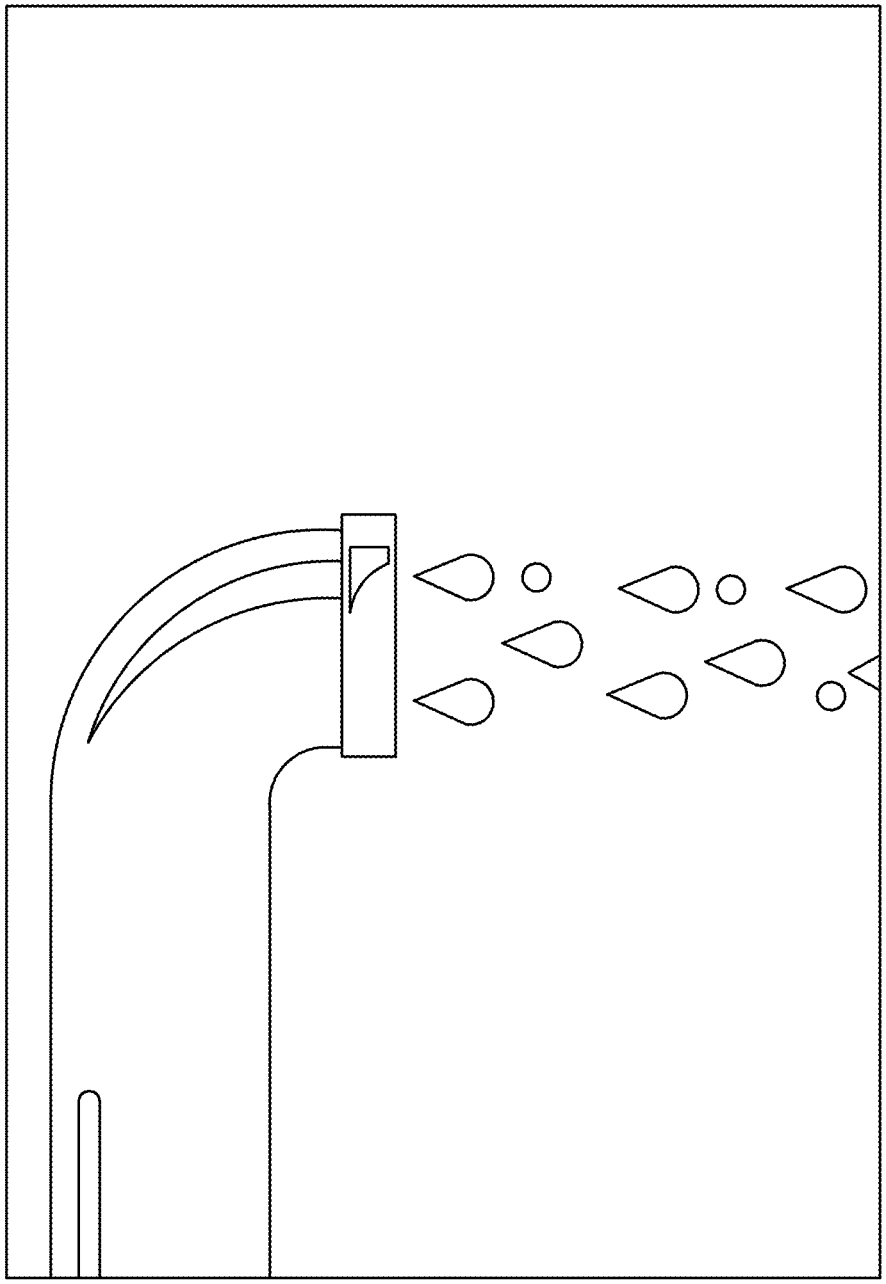
FIG. 4 is a diagram illustrating an example experiential visualization.
Figure 5:
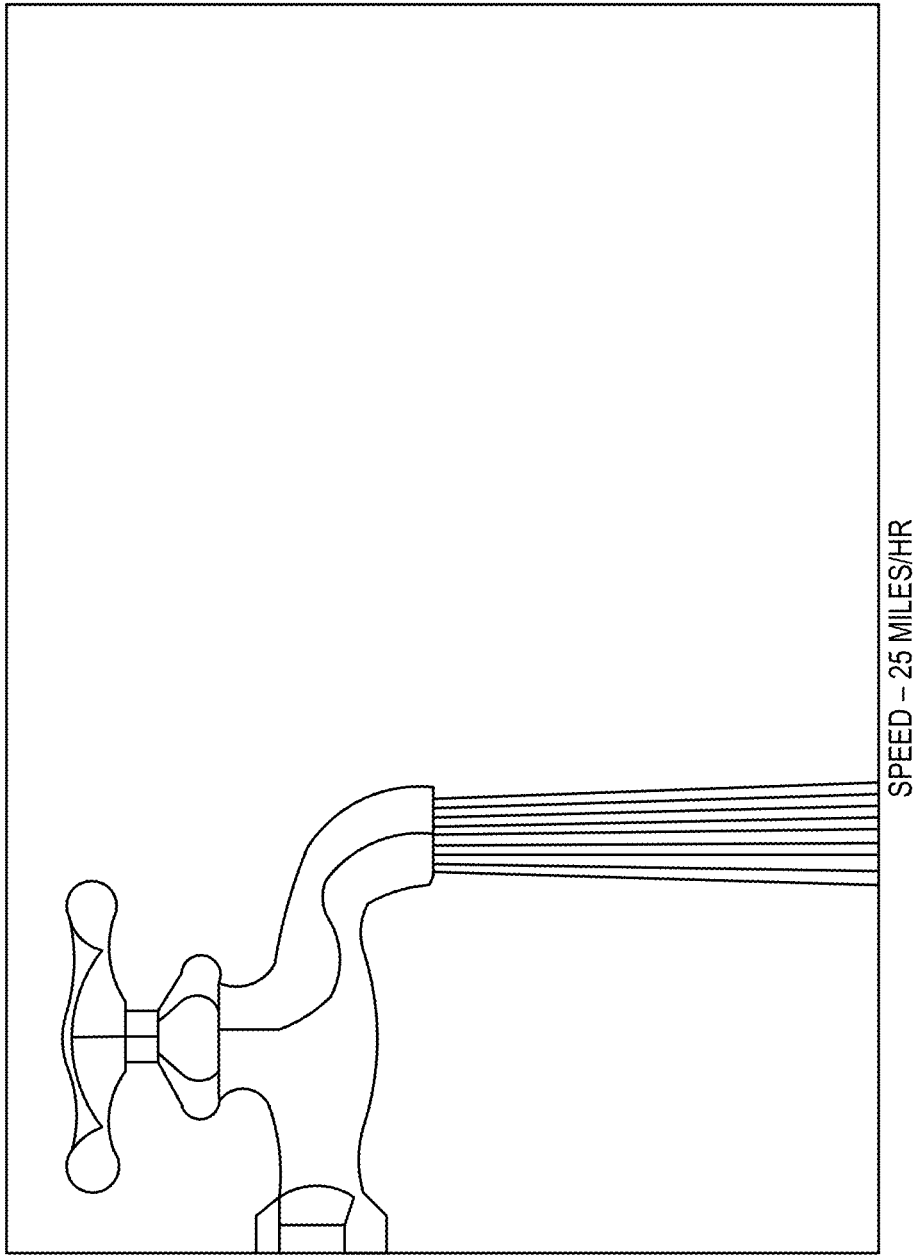
FIG. 5 is a diagram illustrating another example experiential visualization.
Figure 6:
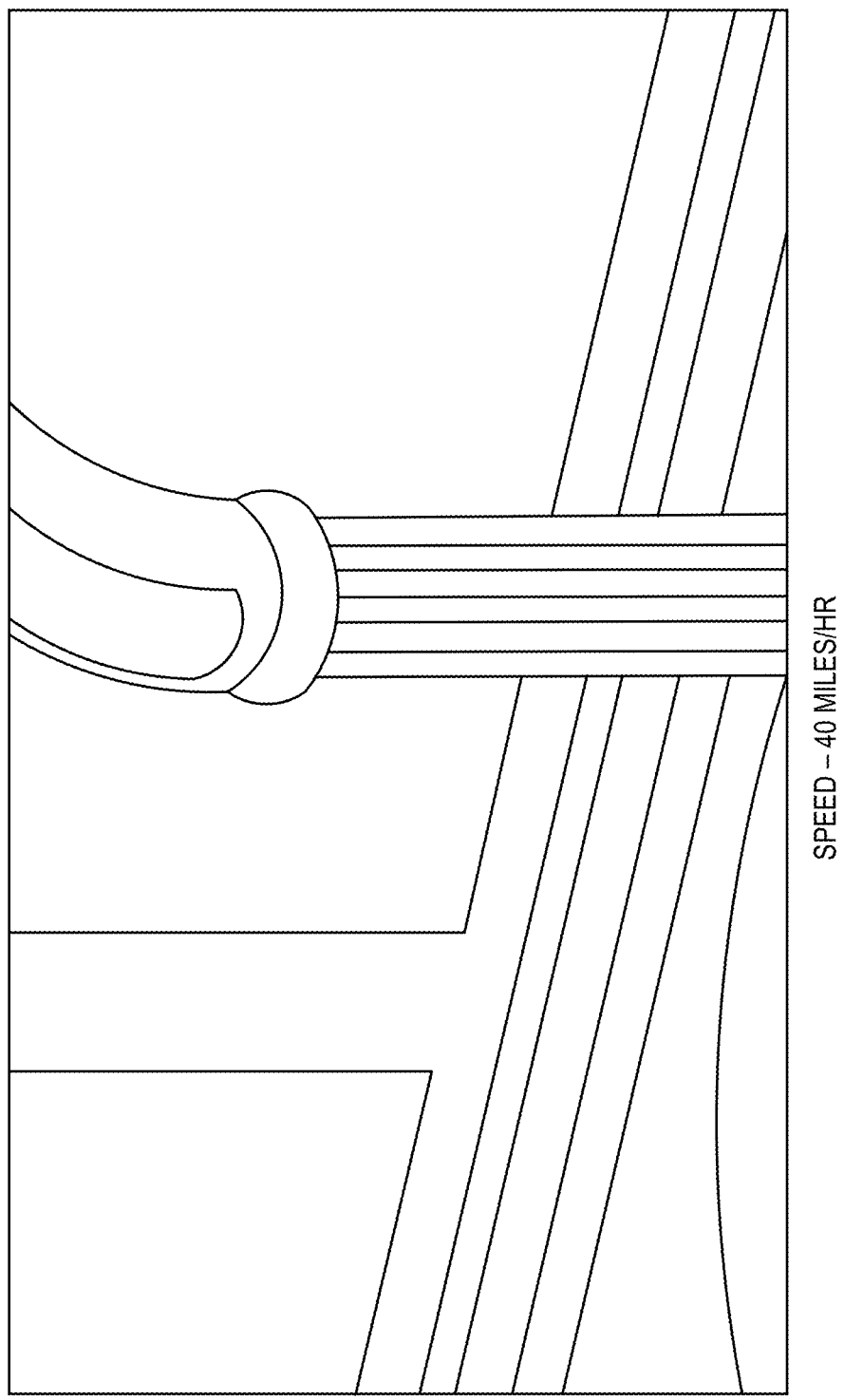
FIG. 6 is a diagram illustrating yet another example experiential visualization.

FIG. 4 is a diagram illustrating an example experiential visualization. FIG. 4 shows an example experiential visualization of water speed at ten miles per hours. FIG. 5 is a diagram illustrating another example experiential visualization. FIG. 5 shows an example experiential visualization of water speed at twenty-five miles per hours. FIG. 6 is a diagram illustrating yet another example experiential visualization. FIG. 6 shows an example experiential visualization of water speed at forty miles per hours.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 7:
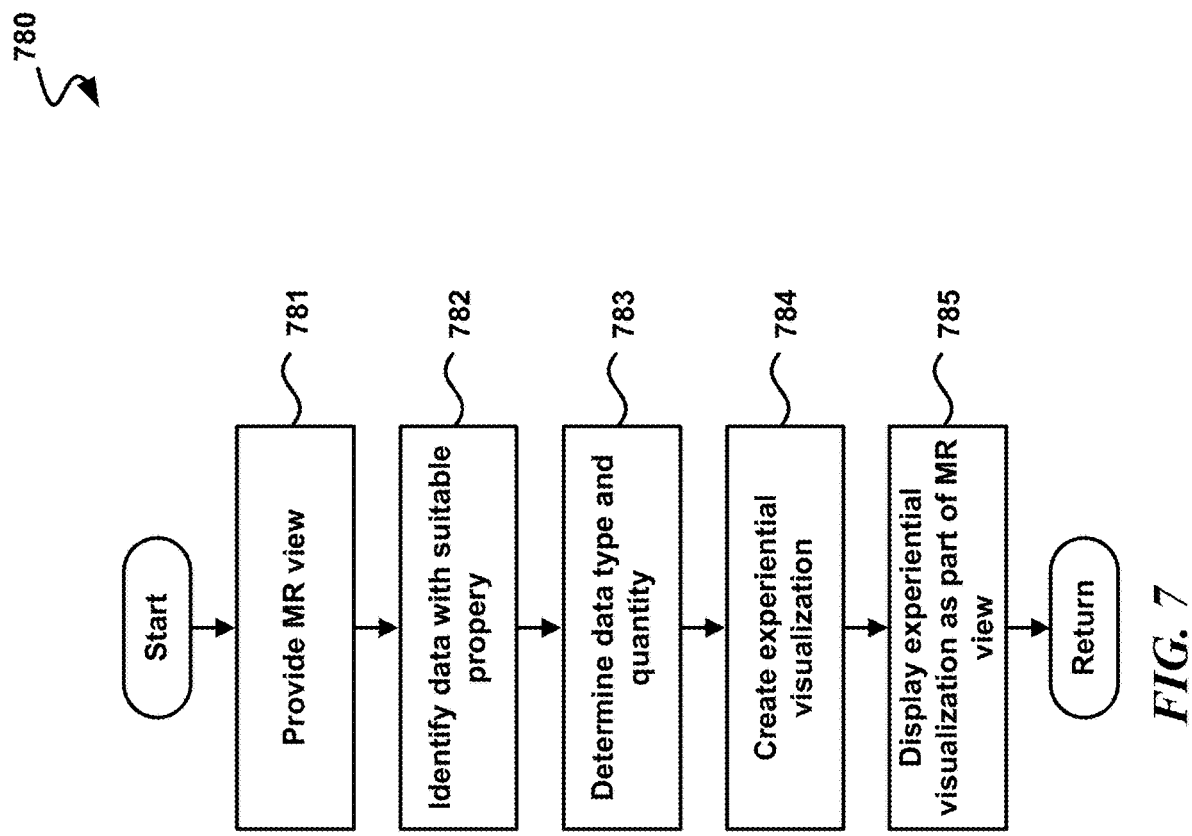
FIG. 7 is a flow diagram illustrating an example process, in accordance with aspects of the present disclosure.

FIG. 7 is a flow diagram illustrating an example process (780) that may be performed, e.g., by an example of MR device 311 of FIG. 3.

In the illustrated example, step 781 occurs first. At step 781, in some examples, a mixed-reality view is provided. In some examples, the mixed-reality view includes at least a real-world component and at least a virtual component. In some examples, the virtual component includes a view associated with an application. As shown, step 782 occurs next in some examples. At step 782, in some examples, data in the application that is associated with a quantified property is identified.

As shown, step 783 occurs next in some examples. At step 783, in some examples, for the identified data, a data type and a quantity are determined. As shown, step 784 occurs next in some examples. At step 784, in some examples, an experiential visualization library is used to create an experiential visualization of the data based on the determined data type and the determined quantity. As shown, step 785 occurs next in some examples. At step 785, in some examples, the created experiential visualization is displayed as part of the virtual component of the mixed reality view.

The process may then proceed to a return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
    a device including at least one memory adapted to store run-time data for the device, and at least one processor that is adapted to execute processor-executable code that, in response to execution, enables the device to perform actions, including:
        providing a mixed-reality view, wherein the mixed-reality view includes at least a real-world component and at least a virtual component, and wherein the virtual component includes a view associated with an application;
        identifying data in text displayed by the application that is associated with a quantified property;
        determining, for the identified data in the text displayed by the application, a data type and a quantity;
        using an experiential visualization library to create an experiential visualization of the data based on the determined data type and the determined quantity; and
        displaying the created experiential visualization as part of the virtual component of the mixed reality view such that the created experiential visualization visually represents the determined quantity by at least one of: a dynamic representation of the determined quantity or a comparison of the determined quantity with a different quantity.

2. The apparatus of claim 1, wherein machine learning is used to determine the data type and quantity for the identified data.

3. The apparatus of claim 1, wherein the created experiential visualization includes at least one moving three-dimensional hologram that is associated with the determined data type and the determined quantity.

4. The apparatus of claim 1,
    wherein identifying the data includes:
        allowing the user to select data; and
        determining whether the selected data is associated with a quantified property for which a corresponding data type exists in the experiential visualization library.

5. The apparatus of claim 1, wherein at least one aspect of the created experiential visualization varies in a realistic manner in accordance with the determined quantity.

6. The apparatus of claim 1, wherein the device is mixed-reality device including at least one holographic processing unit and a head-mounted display unit connected to a headband.

7. The apparatus of claim 1, further comprising enabling the user to adjust the experiential visualization.

8. The apparatus of claim 7, wherein enabling the user to adjust the experiential visualization includes allowing the user to filter data shown in the experiential visualization.

9. The apparatus of claim 1, wherein the quantified property is associated with motion.

10. The apparatus of claim 9, wherein the quantified property is velocity.

11. A method, comprising:
    displaying a mixed-reality view, wherein the mixed-reality view includes at least a virtual aspect and at least a real-world component, and wherein the virtual aspect includes at least a portion of an application view associated with an application;
    enabling a user to select data in text displayed by the application that is associated with a quantified property;
    using at least one processor to identify, for the selected data in the text displayed by the application, a data type and a quantity;
    using an experiential representation repository to provide an experiential representation of the data based on the identified data type and the identified quantity; and
    displaying the provided experiential representation as part of the virtual aspect of the mixed reality view such that the created experiential visualization visually represents the determined quantity by at least one of: a dynamic representation of the determined quantity or a comparison of the determined quantity with a different quantity.

12. The method of claim 11, wherein machine learning is used to identify the data type and quantity for the selected data.

13. The method of claim 11, wherein the created experiential representation includes at least one moving three-dimensional hologram that is associated with the identified data type and the identified quantity.

14. The method of claim 11, wherein the quantified property is associated with motion.

15. The method of claim 14, wherein the quantified property is velocity.

16. A processor-readable storage medium, having stored thereon processor-executable code that, upon execution by at least one processor, enables actions, comprising:
- identifying, in text displayed by an application, data that is associated with a quantified property;
- determining, for the identified data in the text displayed by the application, a data type and a quantity;
- using an experiential representation library to create an experiential representation of the data based on the determined data type and the determined quantity; and
- providing the created experiential representation such that the created experiential visualization visually represents the determined quantity by at least one of: a dynamic representation of the determined quantity or a comparison of the determined quantity with a different quantity.

17. The processor-readable storage medium of claim 16, wherein machine learning is used to determine the data type and quantity for the identified data.

18. The processor-readable storage medium of claim 16, wherein the created experiential representation includes at least one moving three-dimensional hologram that is associated with the determined data type and the determined quantity.

19. The processor-readable storage medium of claim 16, wherein the quantified property is associated with motion.

20. The processor-readable storage medium of claim 19, wherein the quantified property is velocity.

* * * * *